US 8,073,816 B1

(12) United States Patent
Luke et al.

(10) Patent No.: US 8,073,816 B1
(45) Date of Patent: Dec. 6, 2011

(54) VOLUME FORMAT CONVERSION

(75) Inventors: Stanley Luke, Stow, MA (US); Nils Wygant, Nashua, NH (US); Aamir Rashid, Sharon, MA (US); Ravikanth Dronamraju, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 385 days.

(21) Appl. No.: 12/426,597

(22) Filed: Apr. 20, 2009

(51) Int. Cl.
*G06F 7/00* (2006.01)
(52) U.S. Cl. ...................................................... 707/644
(58) Field of Classification Search .................. None
See application file for complete search history.

(56) References Cited

U.S. PATENT DOCUMENTS

2005/0086249 A1* 4/2005 Keohane et al. ............. 707/102
* cited by examiner

*Primary Examiner* — Pierre Vital
*Assistant Examiner* — Truong Vo
(74) *Attorney, Agent, or Firm* — Cooper Legal Group, LLC

(57) ABSTRACT

Data storage volumes, such as a file system on a storage system, may utilize a particular operating system format. Converting a volume to a different format may be desirable at times. However, this can be time consuming and resource intensive if data needs to be copied. Accordingly, substantially copying-free, in-place conversion of a data-storage volume from a first format to a second format is provided herein. In one embodiment, it is determined whether the volume can be converted, for example, by comparing compatibility of features between the first and second formats. A desired feature list is retrieved and respective features are checked for compatibility. Access to the volume is blocked during the conversion, and the volume is converted if the features are found to be compatible. If the conversion is successful, post conversion operations are performed, including unblocking the volume and notifying clients that the volume is available for access.

32 Claims, 9 Drawing Sheets

VOLUME FORMAT CONVERSION

BACKGROUND

In a computing environment, a data storage and management system can provide access to information stored on one or a plurality of storage devices networked to the system. Storage devices may comprise disk drives, a plurality of which can be organized as disk arrays. Disks may describe a magnetic media storage unit, and may be synonymous with a hard disk drive, a direct access storage device, solid state drive, or other similar media used for persistent data storage. Data can be organized into volumes that are comprised on disk drives of one or more storage devices.

A plurality of storage system may be interconnected to provide a distributed storage system, for example, designed to mitigate problems with data access speed and availability. Such a clustered system distributes volumes serviced by a particular storage system to the plurality of storage systems in the cluster. This, in-turn, distributes data access requests among the respective storage systems in the cluster, thereby distributing a processing load that may accompany said requests.

Storage systems, including clustered storage systems, can be configured to accommodate a plurality of clients, in a client/server model, for data access and management. For example, a client may comprise an application running on a computer that connects to the storage system (or cluster) over a network. Respective clients can typically request services from the storage system by issuing packet-based, protocol requests to the system over the network. In-turn, the storage system may return requested data, or perform some data management request.

Storage of information on disk drives or disk arrays can be implemented as a file-system (volumes) that may span a portion of a disk, a cluster of disks, or portions of disks, for example. A data-storage volume typically defines an overall logical arrangement of file storage on disk space in the storage system. Volumes are configured in formats that may be associated with particular storage systems. For example, where one storage system may utilize a certain format for their volumes, another storage system may utilize a different format for their volumes.

Respective volume formats typically comprise features that provide functionality to the volumes, such as providing an ability for volumes to form clusters. As new features are developed, for example, newer versions of volume formats may become available. However, it may be desirable to merely develop a single common format for two or more different formats, instead of continuing to develop new (and often divergent) versions for two or more formats. A single common format simplifies operations at least by mitigating a need to track and learn various formats. Therefore, it may be desirable to develop a common volume format and be able to convert different formats into a single common format.

Currently, converting a volume from a first format to a second format may require that an administrator copy all the data on the volume to a new volume in the second format. This type of data copying can be very time consuming and resource intensive, particularly if there are large amounts of data in respective volumes, such as large enterprise data storage systems. Further, during copying the volume is typically inaccessible to requests, and if the copying takes a long time, enterprises that require time sensitive access to data may be reluctant to perform such a conversion.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Techniques and/or systems are disclosed herein for performing in-place conversion of a data-storage volume from a first format to a second format. For example, where different application management system formats for a volume may comprise various features, the techniques and/or systems disclosed herein can convert the volume to a common format while mitigating a copying of data on the volume, and mitigating volume down-time.

In one embodiment, it is determined whether a conversion from the first format to the second format can be performed on the data-storage volume, for example, using components disposed in a storage application management system, such as an operating system. In one example, the volume intended for conversion may comprise a volume manifest that identifies interesting features for the volume, and one can query the manifest to identify these features. Further, compatibility of the desired features with the second format can be determined, for example, by comparing the features with those present in the second format.

In this embodiment, if it is determined that a volume conversion can proceed, the data-storage volume application management system can convert the volume from the first format to the second format. In preparation for the conversion data requests for the data-storage volume can be blocked, for example, preventing administrators and clients from changing data on the volume during conversion. If the conversion is completed in a desired manner, a data-storage volume manager can perform post-conversion operations, which may comprise unblocking the volume for data requests, and notifying client users that the volume is accessible.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
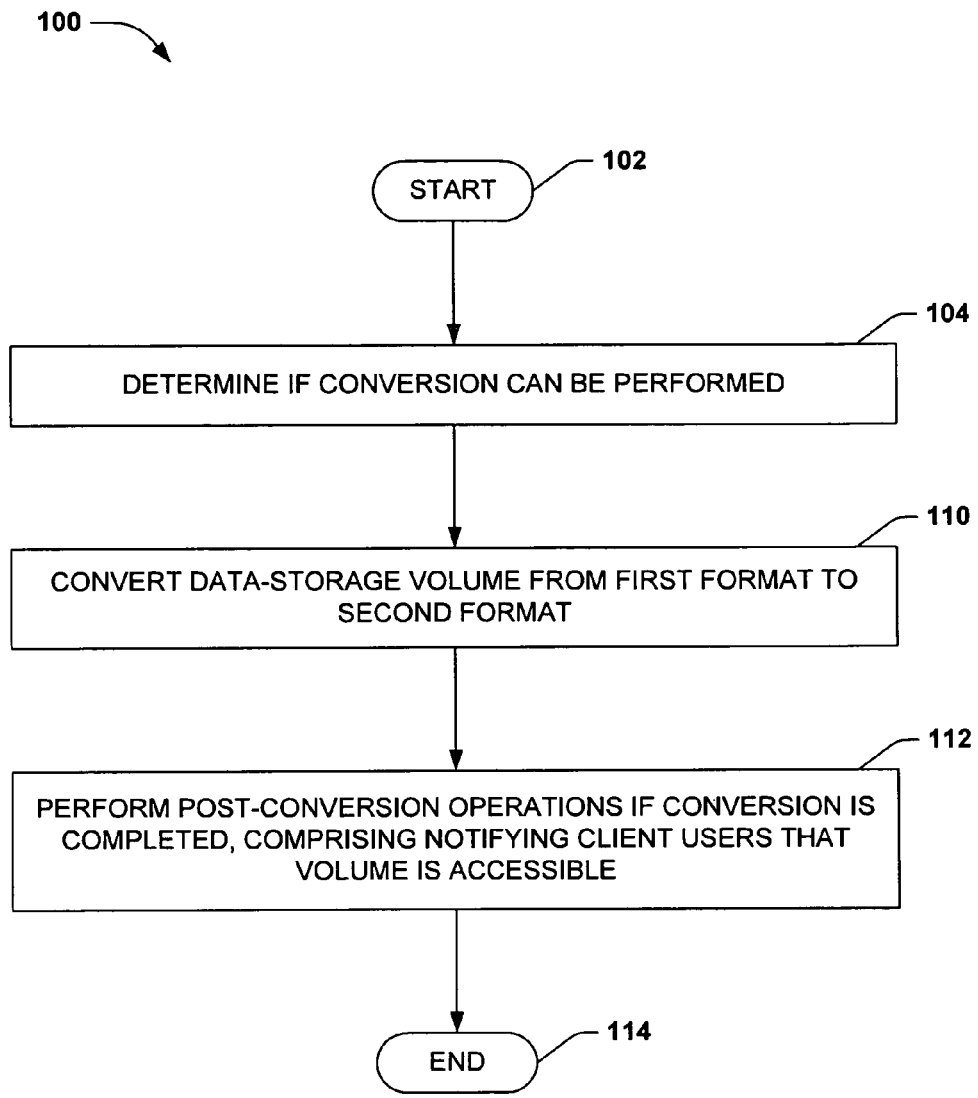
FIG. 1 is a flow diagram of an exemplary method for performing in-place conversion of a data-storage volume from a first format to a second format.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Embodiments described herein relate to techniques and systems for performing an in-place conversion of a data-storage volume from a first format to a second format. In one example, the first and second formats may correspond to application management system formats (e.g., operating system formats) utilized to manage a volume. Moreover, the second format is a format that is common to more than one format (of a data storage volume). That is, while the first format can be converted in-place (e.g., on the volume) to the second format, other formats (of a data storage volume) can likewise be converted in-place to the second format so that there is a substantially consistent and unified format for the data storage volume. Accordingly, while the discussion herein may primarily be had in terms of converting from a first format to a second format, it will be appreciated that multiple different formats can be converted to the second format without departing from the spirit and scope of the instant disclosure and the claims comprised herein. Thus, at times, the first format may be characterized herein as comprising different or multiple formats as a reflection of the fact that more than just one or a single format can be converted to the second format. For example, the first format may be regarded as comprising at least two different formats, where the second format is nevertheless common to the different formats of the first format.

A method may be devised that allows a format of a data-storage volume to be converted in-place (e.g., on the volume without being unmounted) to a second format, for example, mitigating copying volume data to the second format on another volume. For example, different data-storage volumes may exist in different formats. In this example, it may be desirable to develop a common volume format for the plurality of different formats instead of continuing to develop updated versions for the respective disparate formats. Therefore, it may also be desirable to be able to convert the differing volumes into the common format in-place, reducing time and resources needed to perform the conversion, for example.

FIG. 1 is a flow diagram of an exemplary method 100 for performing in-place conversion of a data-storage volume from a first format to a second format. The exemplary method 100 begins at 102 and involves determining if the conversion from the first format to the second format can be performed, at 104. For example, prior to beginning a volume format transition, it is determined whether the volume will function appropriately if it is converted. In one embodiment, the first format may comprise one of a plurality of volume formats that can be converted into the second volume format. That is, there may be a number of different volume formats that can be converted into the second format.

In one embodiment, determining if the conversion from the first format to the second format can be performed can comprise identifying an inventory of desired features of the volume from a volume manifest. A volume manifest can comprise a list of volume features specific to the current volume format, for example. In one embodiment, desired features can comprise a list of those features that are interesting for volume conversion (e.g., those desired by a storage volume administrator to be utilized in or propagated to the second format of the volume). For example, a volume in a first format may implement a particular user interface (e.g., look and feel thereof) and/or may utilize sub-systems on the volume, such as NIFS and CIFS, and the user interface and/or these sub-system (features) may be affected by the volume conversion (e.g., appear and/or operate differently). Therefore, the administrator may wish to determine whether these features will be available on the volume in the second format.

In one embodiment, compatibility of the desired features with the second format is determined. In this embodiment, the volume manifest can be queried for respective desired features' status, and the application management system for the volume can determine whether the features will be supported in the second format by reviewing a table of supported features, for example. That is, while a common format (e.g., that is common to both the first and second formats) may be developed to accommodate conversion from prior disparate formats, the common format may not presently account for all features available in the prior formats. Thus, further consideration is given to, not only whether the conversion can technically be accomplished, but also whether the "converted to" second format comprises the specific nuanced or desired features that were present in the prior format(s), such as whether NIFS and CIFS sub-systems, for example, (that may be preferable to an administrator) are supported by the second format.

Further, in this embodiment, the application management system for the volume can determine whether the respective desired features are implemented differently in the second format. As an example, while volume features from a prior version may be supported in a common format, some of the features may be implemented differently in the common format, thereby presenting potential problems for volume conversion. For example, a user of the common format may not be able to access data in a same way as in the prior version (e.g., because a particular user interface may appear and/or operate differently in the second or "converted to" format).

At 110, if it is determined that a conversion from the first format to the second format can be performed on the data-storage volume, the data-storage volume operating system converts the data-storage volume from the first format to the second format. As an example, if it is determined that desired features from the volume can be supported in the second format and will be implemented in a same way, the volume format conversion can proceed. Prior to conversion, data requests for the data-storage volume can be blocked, for example, so that the volume is not accessed during conversion.

At 112, if the conversion is completed in a desired manner, a data-storage volume manager performs post-conversion operations. Post-conversion operations can comprise unblocking the volume for data requests and notifying client users that the volume is accessible. For example, if the volume has been successfully converted to the second, common format the volume manager can once again allow access to the volume and notify users of the storage system that the volume is accessible again for data access. It is to be appreciated that while the foregoing and the below are described as being implemented in the context of an application management system, such as an operating system, for example, that some or all of the disclosure herein may likewise be implemented in firmware, hardware, etc. and/or a combination thereof.

Figure 2:
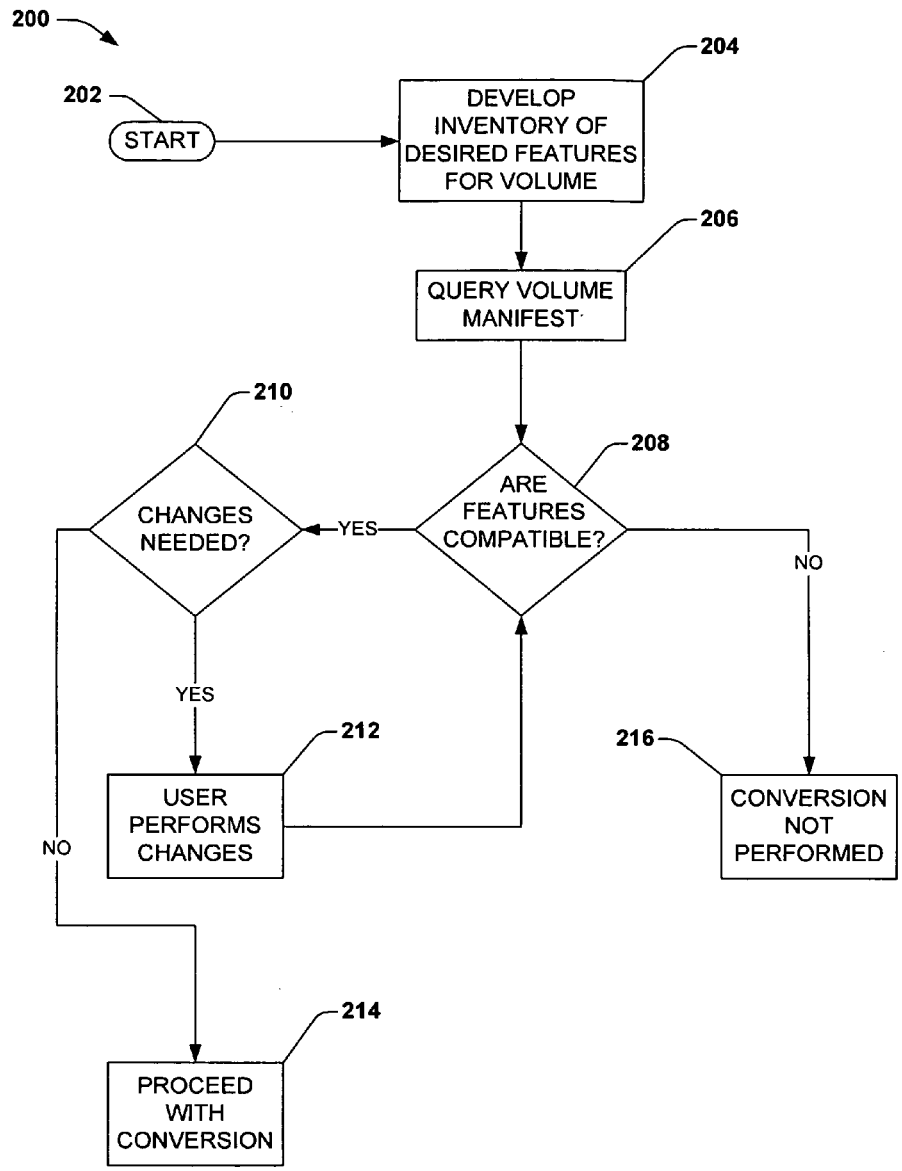
FIG. 2 is a flow diagram illustrating exemplary portions of a method where pre-conversion operations are performed for a volume.
Figure 3:
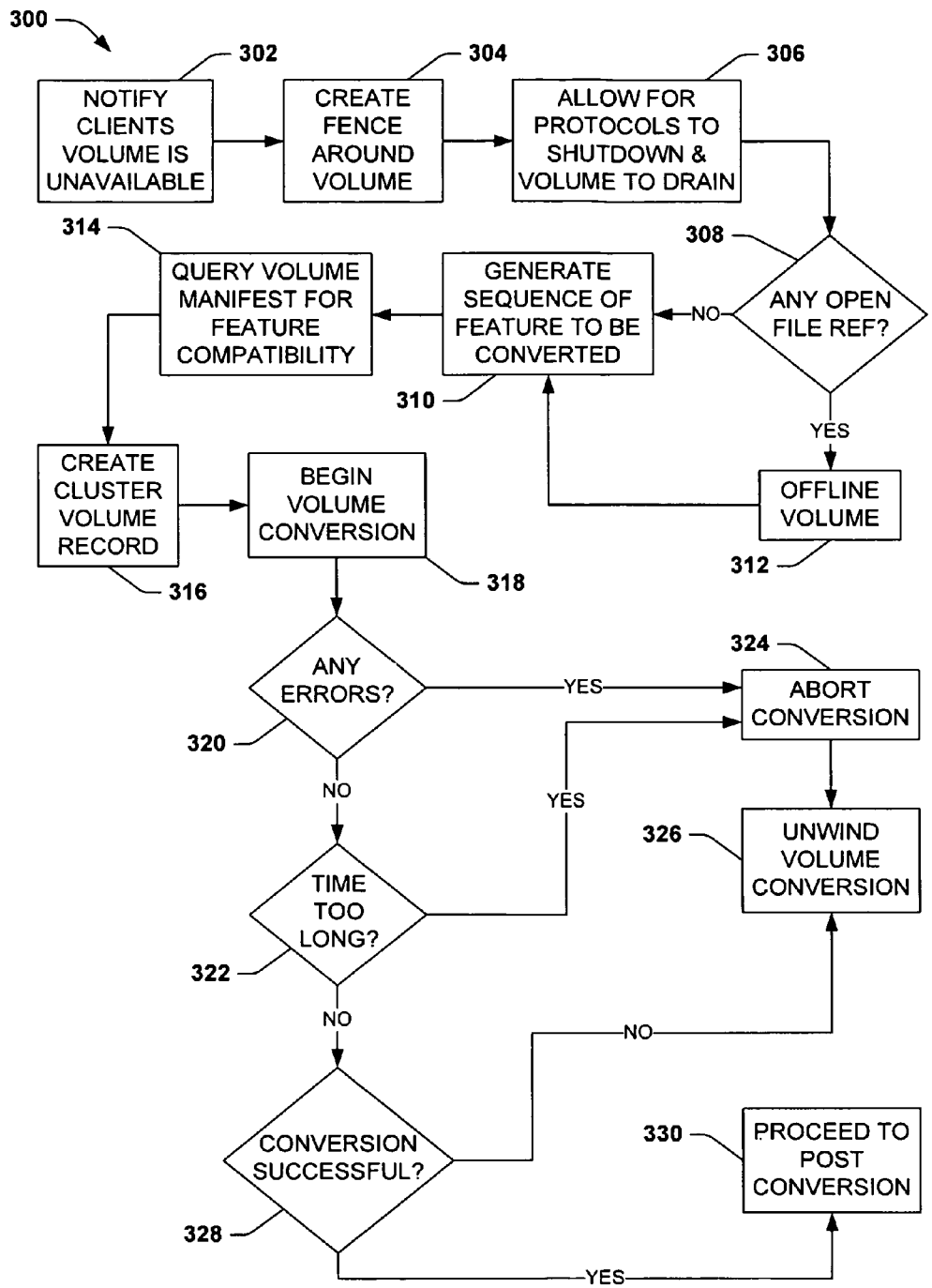
FIG. 3 is a flow diagram illustrating exemplary portions of a method where volume conversion operations are performed for a volume.
Figure 4:
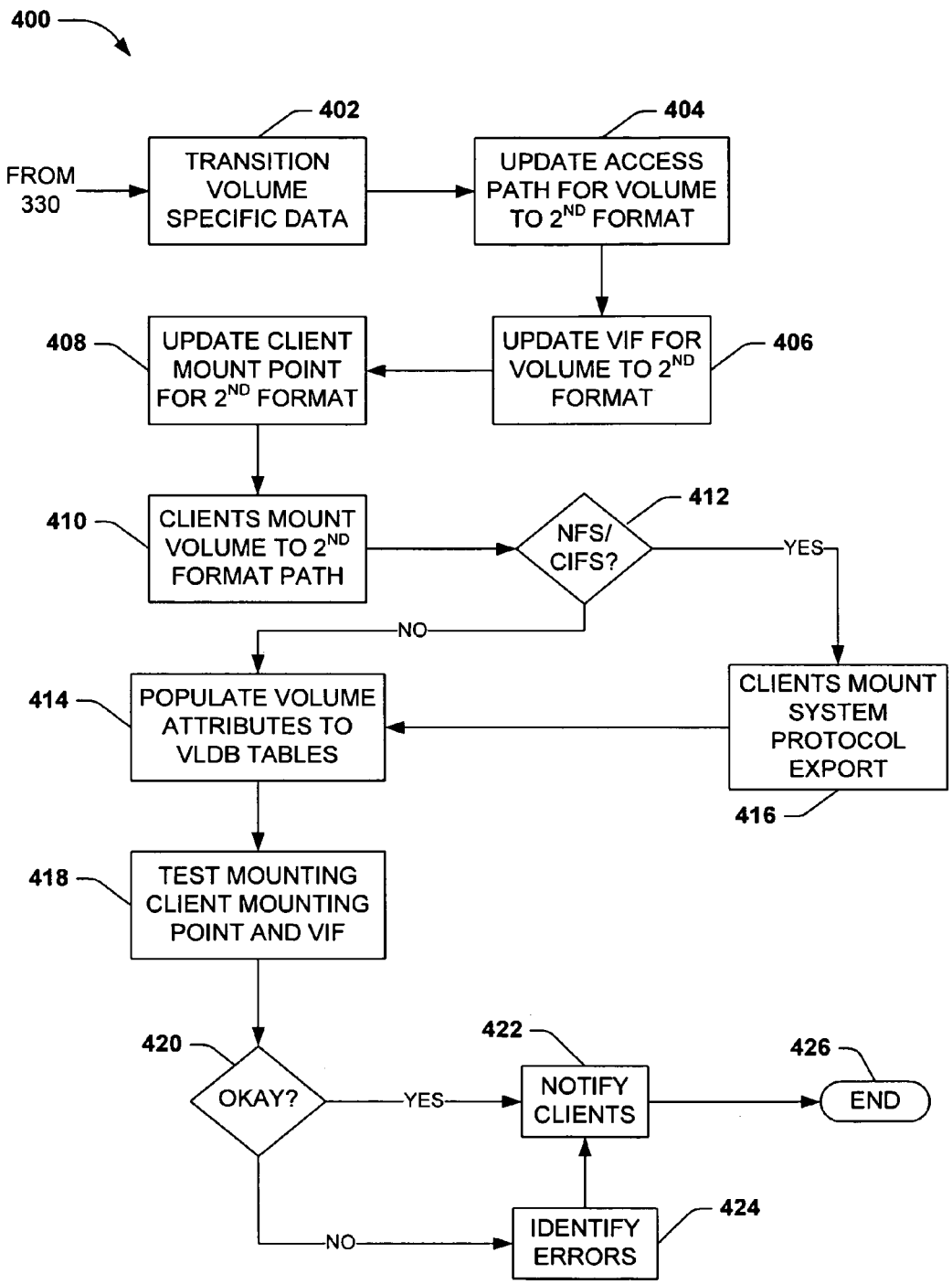
FIG. 4 is a flow diagram illustrating exemplary portions of a method where post-conversion operations are performed for a volume.

FIGS. 2-4 provide flow-diagrams illustrating exemplary portions of a method for performing in-place conversion of a data-storage volume from a first format to a second format, while mitigating data copying for the volume conversion, such as the method 100 illustrated in FIG. 1, for example. FIG. 2 is a flow diagram illustrating an exemplary method 200 corresponding to at least some of a method for performing in-place conversion of a data-storage volume, and more particularly to where pre-conversion operations are performed for the volume.

The exemplary method begins at 202 and involves developing an inventory of desired features for the volume to be converted, at 204. For example, a volume may have particular sub-systems (e.g., network file system (NFS) and write anywhere file layout (WAFL)) that are implemented, which can have particular features associated with them. In this example, the list of features associated with desired sub-systems that will be implemented in the second format can be developed.

At 206, a volume manifest of the volume to be converted can be queried to determine a status of the respective desired features. As an example, in one embodiment, it may be desirable to allow data access to the volume for as long as appropriate prior to blocking the volume from data access. Preventing data access for the volume for any length of time can have deleterious effects on an enterprise that relies on the data, for example. Therefore, mitigating a time that the volume is blocked from access can be quite valuable. In this embodiment, status of desired features for a volume can be queried one at a time, and merely after all queries have been answered can the volume transition proceed.

In another embodiment, a query to the volume manifest may identify those features that are present in the volume in the first format. In this embodiment, a subsequent check may be performed to query a table used to map those identified features that are supported in the second volume format. In this way, for example, the subsequent table check can identify which of the features from the first volume format are supported in the second volume format.

At 208, a status of the respective desired features is determined, such as whether the feature is compatible with the second format, and an answer to the query is returned from the volume manifest. For example, in querying the volume manifest for a status, it can be determined whether the desired feature is supported in the second format and whether the desired feature is implemented differently in the second format.

If it is determined that either the respective desired features are not supported in the second format or the respective desired features are implemented differently in the second format, for example, the query to the manifest return will return an answer reflecting the determination (e.g., "untrue" in response to a query "can feature be converted?"), at 208. If it is determined that the volume cannot be converted, the conversion will not be performed, at 216.

However, in this embodiment 200, if it is determined that the volume conversion can proceed, at 208, according to the volume manifest queries, it may be determined whether one or more features need to be re-configured, at 210. For example, if the query to the manifest reveals that a feature is not compatible in the second format, or is implemented differently, it may be able to be reconfigured prior to conversion. At 212, a user/administrator may reconfigure the one or more features, as needed, and it can be determined if the reconfigured features are compatible at 208.

If it is determined that incompatibilities exist, at 212, the volume conversion will not be performed, at 216. Additionally, in one embodiment, performing the simulation may yield a list of incompatibilities for an administrator. In this embodiment, for example, the administrator can go through the list of incompatibilities and attempt to resolve any outstanding issues that prevent volume conversion.

On the other hand, at 210, if there are no features that need to be reconfigured, the exemplary method 200 can proceed to the volume conversion, at 214.

FIG. 3 is a flow diagram illustrating an exemplary method 300 corresponding to at least some of a method for performing in-place conversion of a data-storage volume, and more particularly to where volume conversion operations are performed. The exemplary method 300 begins at 302 and involves notifying clients, which may be using the volume planned for conversion, that the volume will be unavailable during the conversion. In one embodiment, the notification may also approximate a time that the volume will be unavailable. Further, notification to the clients can comprise a notice that the volume path that was associated with the first format is no longer valid.

In another embodiment, where the conversion is expected to take less than a desired amount of time (e.g., less than a period of time that might be typically tolerable for a user client) no notification need be sent. In this embodiment, data requests for the volume can be queued and executed after volume conversion, for example. For example, clients that are part of a storage area network (SAN) that may utilize an iSCSI or Fiber Channel architecture may not need a client notification. In other embodiments, the volume implementation in the second format may not require client notifications.

At 304, data access for the volume is blocked by creating a fence around the volume, which mitigates a possibility for clients to access the volume during conversion. In another embodiment, administrator access to the volume can also be blocked to prevent attempted access during conversion. In this way, for example, the volume cannot be changed during the conversion to the second format. Further, fencing the volume can prevent a user from adding features while a manifest or check table is being consulted for compatibility, as described above, which may mitigate a race condition from occurring, for example.

After the volume has been isolated from potential changes and access, protocols are allowed to shutdown (e.g., finish processing) and the volume is allowed to drain (e.g., run out) any currently running processes, at 306. By way of example, a system administrator could be configured to monitor and/or manage this and similar activities (e.g., to provide an indication as to degree or level of completion). In this way, the volume can be essentially static so that the conversion process may execute more smoothly. If, however, any file references remain open for the volume, at 308, the volume can be taken completely offline, at 312, to facilitate conversion. As an example, a pending data access may cause a feature to change (or be instantiated) prior to conversion, therefore, inhibiting access to the volume is typically advantageous.

If there are no open file references for the volume, at 308, or the volume has been taken offline, at 312, a sequence for processing the desired features can be generated for the volume conversion process. In one embodiment, the features from the first format of the volume can be compiled into a sequence of conversion that will be used for the actual volume conversion process. After a sequence is generated, the features of the sequence can be queried against the volume manifest once again, at 314, to determine if they are compatible for the second format.

In one embodiment, a volume may be associated with a clustered storage system, for example, where a volume may spread over a set of two or more storage systems networked together to act as one. In this embodiment, at 316, a volume record for the cluster can be created, for example, to identify that the volume will comprise the second format so that the cluster may properly identify the volume and its associated paths. The cluster record may be comprised in a cluster manager that utilizes a volume database for identifying volume locations and paths, for example.

At 318, volume conversion is begun. In one embodiment, converting the volume from the first format to the second format can comprise populating second format specific attributes to the volume. For example, while user-base data (e.g., data used by clients) on the volume may not change in the volume conversion, certain metadata that identifies how the volume is constructed, accessed, and other volume features can be updated to the second format. As an example, eighty to ninety percent of the metadata that identifies a volume's features will typically not be changed between formats. However, the remaining attributes can be populated for the volume to reflect a change to the second format.

In one embodiment, a "simulation" option may be provided at or prior to beginning the volume conversion, as in 318 above. In this embodiment, the simulation option may be a feature mode that allows a user to "try out" the conversion without actually converting the volume from the first format to the second format, for example. In this way, users may be able to see what changes the conversion may have on the volume, and/or what may need to be changed in order to get from the first to the second formats, for example. In this embodiment, one may be able to glean insight into respective problems that may occur for the conversion prior to actually converting the volume, allowing for an (early) exit from the exemplary method 300.

For example, the volume operating system can run a simulation of the desired features from the first format to the second format to determine if there may be incompatibilities. In one embodiment, the volume simulation can be used by an administrator of the storage system to determine if the volume is ready for the conversion. In this embodiment, the administrator may have three options.

A first option may be not to simulate, as the volume manifest queries may suffice, for example. A second option may be to perform a quick simulation, whereby a quick check may be run to determine a potential list of reasons why the conversion may not work, for example. A third option may be to perform a full simulation, which may take longer, for example, but may perform a more complete scan of directory entries or respective nodes of the volume. Where the quick check may result in a partial list of incompatibilities, the full check may give a more complete determination, for example, to help resolve additional issues that may inhibit the volume from being converted.

The conversion can be monitored, for example, by a monitoring application programming interface (API) (e.g., executing on a corresponding storage volume operating system), which may be able to identify conversion errors. At 320, if errors are detected, the conversion can be aborted, at 324, and an error notification can be sent to the administrator, for example. If the conversion is aborted, any changes that may have taken place prior to the error detection can be unwound back to the first format, at 326.

If no errors are detected at 320, the conversion can continue. In one embodiment, the conversion process may be time sensitive. For example, where an enterprise may require almost constant access to data in their storage systems, a desired time limit may be set for the conversion process. In one embodiment, a timer may be used that determines whether the conversion is taking too long, at 322. In another embodiment, a timer may be initiated at a data request for the volume, and determine if the conversion is taking too long by how long the data request lies in queue for a response. At 322, if the conversion appears to be taking longer than a desired amount of time (e.g., typical data requests for a SAN system may be set for no more than 20 second in a queue), the conversion can be aborted at 324, and the conversion unwound, at 326.

If the conversion does not time out, at 322, it can be run until completed. At 328, a determination is made as to whether the conversion was successful. For example, particular metrics can be used to measure whether respective features have been converted to the second format appropriately, and that other elements of the conversion have been completed appropriately. If the conversion is determined not to be, the conversion can be unwound at 326, and the volume returned to the first format.

If the volume conversion is successful, at 328, the exemplary method 300 proceeds to post conversion operations, at 330.

FIG. 4 is a flow diagram illustrating an exemplary method 400 corresponding to at least some of a method for performing in-place conversion of a data-storage volume, and more particularly to where post-conversion operations are performed for the volume. At 402, volume specific data is transitioned (e.g., converted to the second format) for the volume. For example, as the volume configuration has changed to the second format, volume export policies have changed and need to be updated so that the volume can be appropriately viewed by clients.

Further, in this embodiment 400, in order for clients to access and view data on the volume, an access path for the volume is associated to the second format, at 404, a virtual interface (VIF) for the volume is associated to the second format, at 406, and a client mount point for the volume is also updated to accommodate the second format, at 408. In one embodiment, a volume is a virtualized file system that is may not be physically present on one file server. Commonly, the volume is a concept that links data that may be housed on separate disks, disk arrays, or even separate nodes in a storage system. In this embodiment, the volume concept links the disparate files as a single volume that can be viewed and accessed by clients mounted to the system. In order for clients to view and access the second format volume path, VIF, and mounting point should associated to the second format for the volume. For example, a storage administrator can associate a second format rule with the volume so that clients can access the volume as part of a virtual server namespace for a storage system.

At 410, clients that are associated with the volume can mount the volume to the mount point and path associated with the second format for the volume. In one embodiment, if the storage system uses network file system (NFS) protocol or common internet file system (CIFS) protocol, at 412, the clients' target mount point is changed to reflect the change from the first format to the second format; and respective clients can remount the CIFS/NFS export to reset file-handles for data on the volume, at 416.

In one embodiment, where a plurality of volumes may be used in a storage system, such as a clustered storage system, a volume location database (VLDB) may be utilized by a storage system manager to identify locations and attributes for the plurality of volumes. At 414, attributes for the second format volume are populated to tables in the VLDB.

At 418, the second format volume mounting point for a client, the second format volume access path, and second format volume VIF can be tested. If errors occur during the testing (e.g., as identified by a runtime error), at 420, the errors can be sent to a system administrator, at 424, for example, so that potential issues can be addressed prior to allowing client access to the volume. If no errors are identified, at 420, the access to the volume can be unblocked and the clients can be notified that the volume is accessible again, at 422. Further, the clients can be notified that the volume has been converted from the first format to the second format.

In another embodiment, it may be desirable to provide status notification to clients associated with the volume throughout the conversion process. For example, if clients or users perform multiple polling of the volume to determine a status it may ultimately cause a slowdown in the conversion process. Further, features of the volume that may be implemented differently in the second format can be converted so that implementation is similar to what a user may expect. For example, an administrator can review the volume for particular features that are implemented differently in the second volume format, and perform a configuration update to convert their implementation in the second format.

Having opened access to the volume and notified clients the exemplary method 400 ends at 426.

Figure 5:
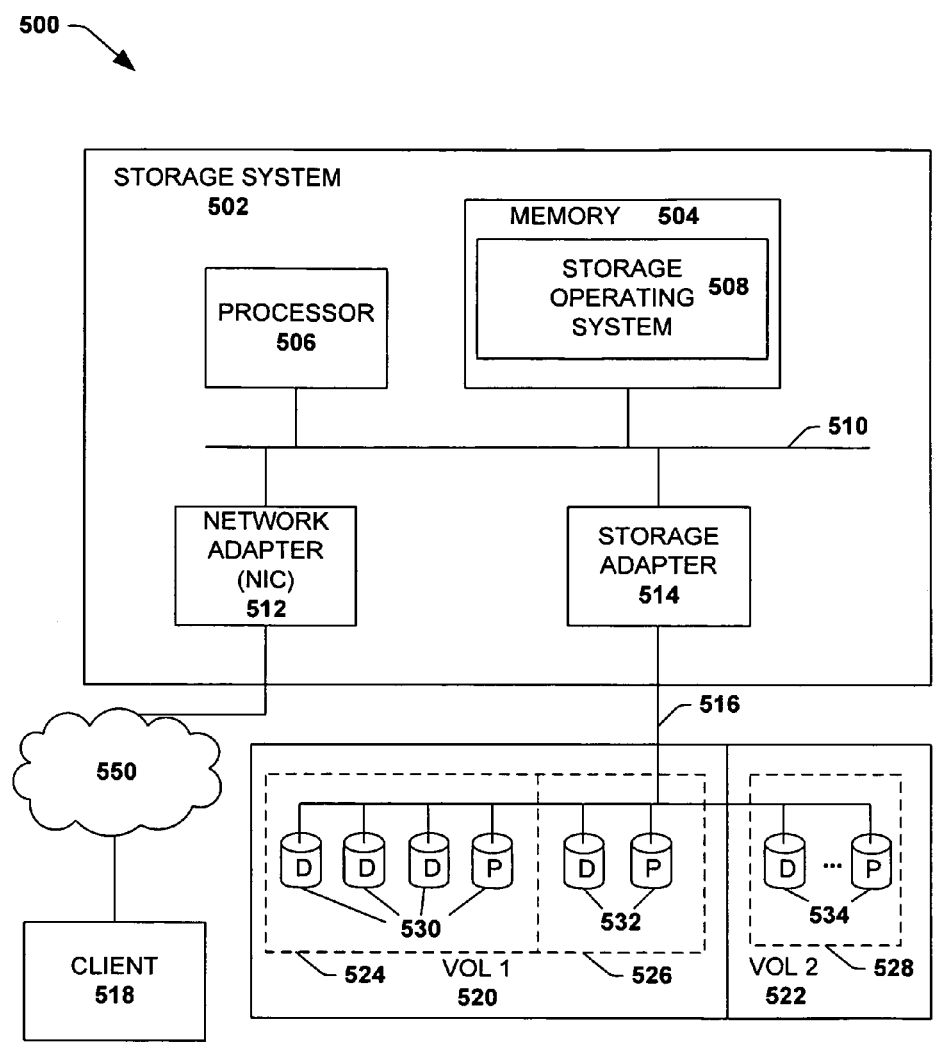
FIG. 5 is a block diagram of an example embodiment of an environment that may implement one or more of the techniques and/or systems, described herein.

FIG. 5 is a block diagram of an example embodiment of an environment 500 including a storage system 502 that may implement one or more of the techniques and/or systems, described herein. The storage system 502 may be a computer that provides access to files stored on mass storage devices, such as disks 530, 532, 534 of a disk array 524, 526, 528. It will be appreciated that the techniques and systems, described herein, are not limited by the example embodiment. For example, disks 530, 532, 534 may comprise any type of mass storage devices, including but not limited to magnetic disk drives, flash memory, and any other similar media adapted to store information, including data and parity information.

The storage system 502 includes a processor 506, a memory 504, a network adapter 512 and a storage adapter 514 interconnected by a system bus 510. The storage system 502 also includes a storage operating system 508 that can, for example, implement a Redundant Array of Independent (or Inexpensive) Disks (RAID) optimization system to optimize the reconstruction process of a failed disk in array 524, 526, 528.

In the example environment 500, memory 504 can include storage locations that are addressable by the processor and adapters for storing related software program code and data structures. The processor and adapters may, for example, include processing elements and/or logic circuitry configured to execute the software code and manipulate the data structures. The storage operating system 508, portions of which are typically resident in memory and executed by the processing elements, functionally organizes the storage system by, inter alia and in one embodiment, invoking storage operations in support of a file service implemented by the storage system. It will be apparent to those skilled in the art that other processing and memory means, including various computer readable media, may be used for storing and executing program instructions pertaining to the inventive techniques described herein.

The network adapter 512 includes the mechanical, electrical and signaling circuitry needed to connect the storage system 502 to a client 518 over a computer network 550, which may comprise, among other things, a point-to-point connection or a shared medium, such as a local area network. The client 518 may be a general-purpose computer configured to execute applications. Moreover, the client 518 may interact with the storage system 502 in accordance with a client/server model of information delivery. For example, the client may request the services of the storage system (e.g., acting as a server), and the storage system may return the results of the services requested by the client, by exchanging packets using protocol formats, such as a Common Internet File System (CIFS) protocol or a Network File System (NFS) protocol, over the network 550.

The storage adapter 514 cooperates with the storage operating system 508 executing on the storage system 502 to access information requested by the client 518. The information may be stored on any type of attached array of writeable media such as magnetic disk drives, flash memory, and any other similar media adapted to store information. In the example environment 500, in one embodiment, the information can be stored in disk blocks on the disks 530, 532, 534. The storage adapter 514 includes input/output (I/O) interface circuitry that couples to the disks over an I/O interconnect arrangement 516, such as a conventional high-performance, Fibre Channel serial link topology. The information is retrieved by the storage adapter 514 and, if necessary, processed by the processor 506 (or the adapter 514 itself) prior to being forwarded over the system bus 510 to the network adapter 512, where the information is formatted into a packet and returned to the client 518.

In one embodiment, storage of information on arrays 524, 526, 528 can be implemented as one or more storage "volumes" 520, 522 that comprise a cluster of disks 530, 532, or 534 defining an overall logical arrangement of disk space. The disks 530, 532, 534 within a volume are typically organized as one or more groups of RAIDs.

In one embodiment, to facilitate access to disks 530, 532, 534, the storage operating system 508 may implement a file system (e.g., write anywhere file system) that logically organizes the information as a hierarchical structure of directories and files on the disks. In this embodiment, respective files may be implemented as a set of disk blocks configured to store information, such as data or parity, whereas the directory may be implemented as a specially formatted file in which other files and directories are stored. In the example environment 500, in one embodiment, the storage operating system 508 may be the NetApp® Data ONTAP® operating system (available from NetApp, Inc., Sunnyvale, Calif.) that implements a Write Anywhere File Layout (WAFL®) file system.

In one embodiment, an administrator of the example environment 500 may provide inputs via the client 518, for example, appropriate for converting a volume (e.g., 520 and 522) from a first format to a second format. For example, an administrator may input one or more commands into a command line interface that initiate a volume conversion, and/or perform other volume conversion operations utilizing software disposed in the storage operating system 508. Further, the administrator may receive volume conversion status updates, errors, or other notifications through the client 518. It will be appreciated that method 100 and/or portions thereof may be implemented as executable code maintained in memory 504 and executed on processor 506, for example.

Figure 6:
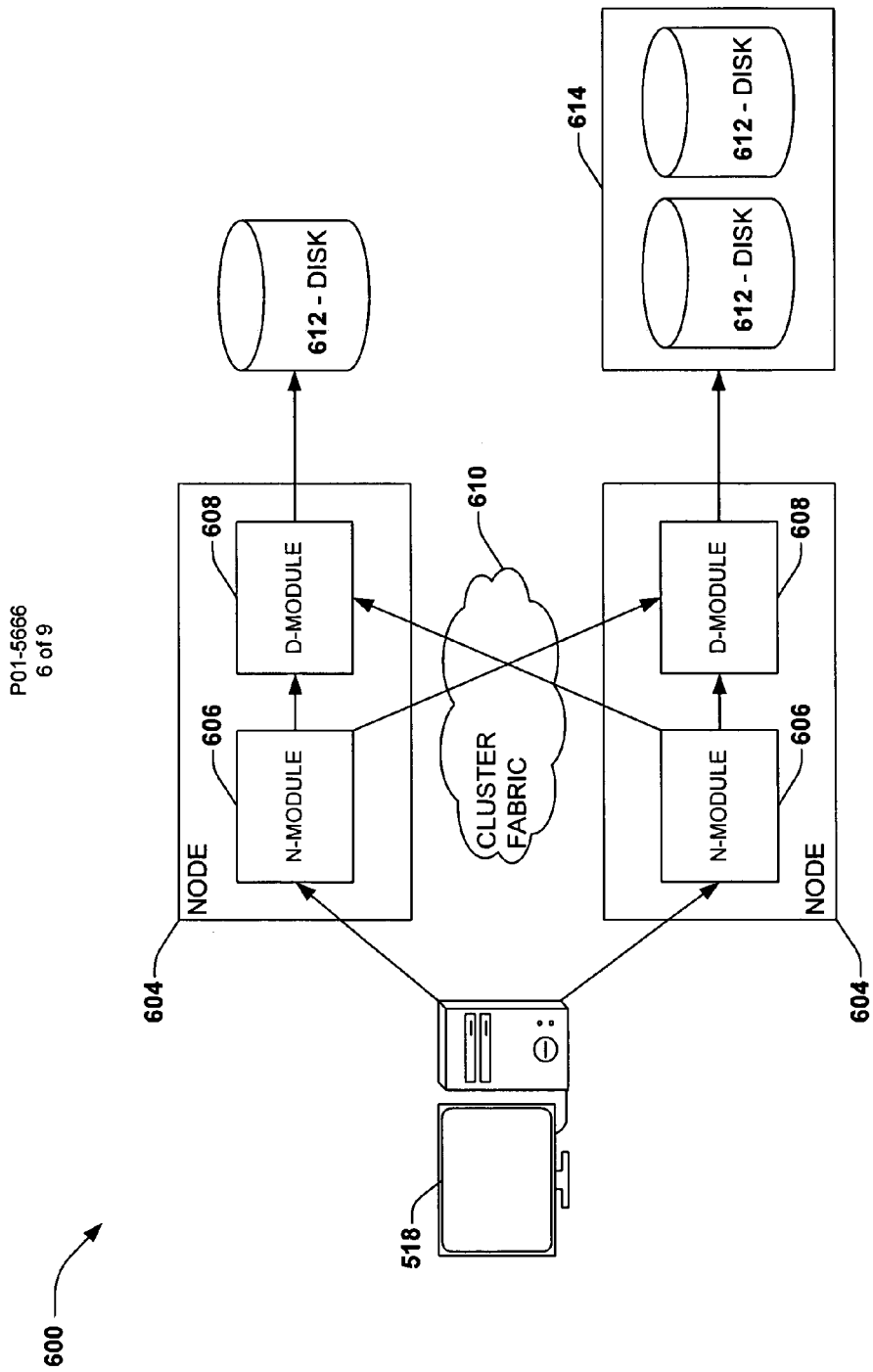
FIG. 6 is an illustration of an example embodiment of a clustered computing environment, such as a data storage and management system.

Although the storage system 502 is illustrated as a single unit in FIG. 5, it can have a distributed architecture. For example, the storage system 502 can be implemented with multiple distributed storage servers. FIG. 6 is an illustration of an example embodiment 600 of a clustered computing environment, such as a data storage and management system. In this embodiment, nodes 604 are interconnected as a cluster to provide data storage and management services, such as to an enterprise, for example. A node 604 in a data storage and management network cluster 600 can be a device attached to the network as a connection point, redistribution point or communication endpoint. A node may be capable of sending, receiving, and/or forwarding information over a network communications channel, and could comprise any device that meets any or all of these criteria. One example of a node may be a data storage and management server attached to a network.

As illustrated in the exemplary embodiment 600, nodes 604 can comprise various functional components that coordinate to provide distributed storage architecture for the cluster. Nodes can comprise a network module 606 (e.g., N-blade) and a disk module 608 (e.g., D-blade). Network modules 606 can be enabled to allow the node 604 to connect with clients 602, for example, allowing the clients 602 to access data stored in the distributed storage system. Disk modules 608 can be enabled to connect one or more storage devices, such as disks 612 or arrays of disks 614, to the node 604. The nodes 602 can be interconnected by a cluster switching fabric 610, for example, allowing respective nodes in the cluster access to data on a disk 612 connected to a different node in the cluster.

It should be appreciated that, while the example embodiment 600 illustrates an equal number of N and D-modules, other embodiments may comprise a differing number of these modules. For example, there may be a plurality of N and/or D modules interconnected in a cluster that does not have a one-to-one correspondence between the N and D-modules. Further, a client 602 may be a general purpose computing device, such as a desktop personal computer, configured to network with a node 604 in the cluster. For example, respective clients 602 networked to a cluster may request services of a node 604 in the cluster, and the node 604 can return results of the requested services to the client 602.

Figure 7:
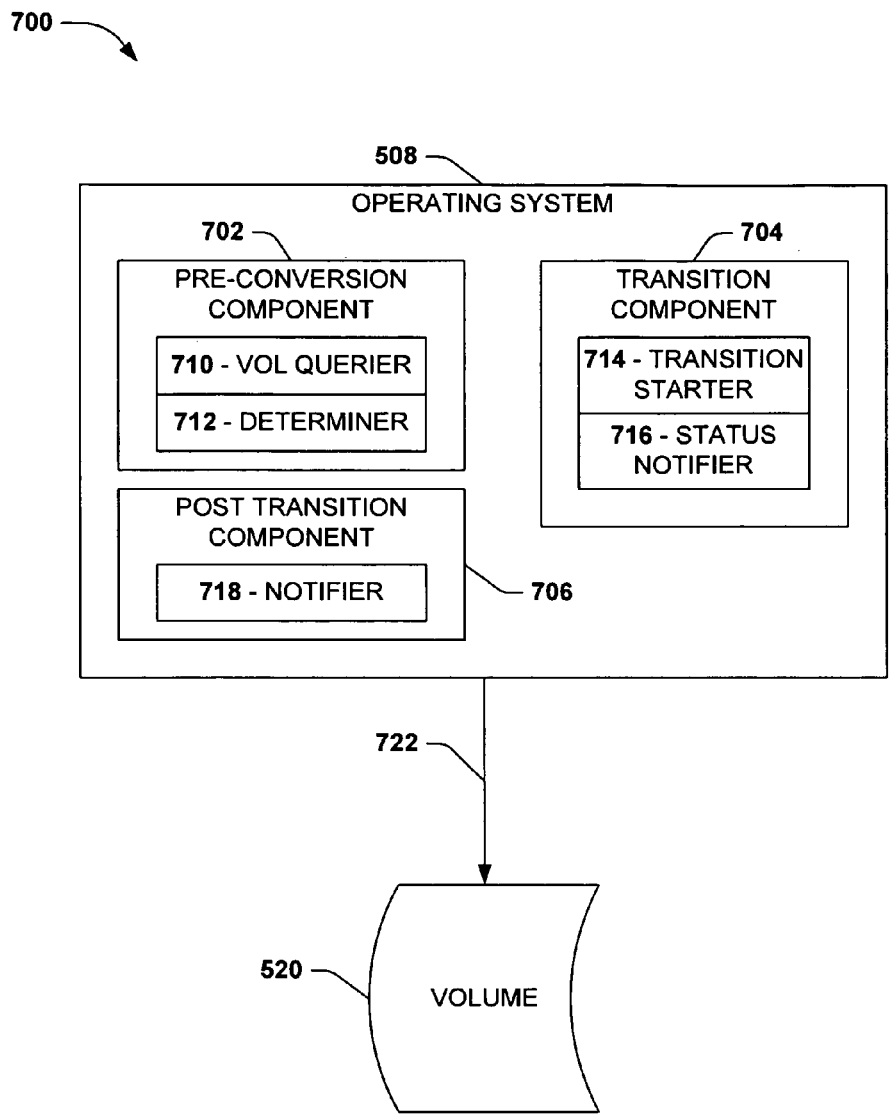
FIG. 7 is a diagram of an exemplary system that performs an in-place conversion of a data-storage volume from a first format to a second format.

A system may be devised that can perform an in-place conversion of a data-storage volume from a first format to second format. FIG. 7 is a diagram of an exemplary system 700 that performs an in-place conversion of a data-storage volume from a first format to a second format.

In one embodiment, for example, the exemplary system 700 can be implemented in the example environments 500 and 600 of FIGS. 5 and 6. In this embodiment, the example system 700 may merely comprise software components disposed in an operating system 508, portions of which are typically resident in memory (e.g., 504 in FIG. 5) and executed by the processing elements (e.g., 506 in FIG. 5) and other hardware elements in a storage system.

In the exemplary system 700, a volume transition pre-conversion component 702 is disposed in an operating system that is coupled 722 to a volume 520, and is configured to determine if the volume can be converted from a first format to a second format. In one embodiment, the volume 520 may be coupled to the operating system 508 as described in the exemplary environment 500 of FIG. 5 (e.g., 516).

The volume transition pre-conversion component 702 comprises a volume query component 710 configured to query a volume manifest from the volume 520 for a desired feature set. The volume transition pre-conversion component 702 further comprises a conversion compatibility determiner 712 that is configured to determine whether the desired feature set can be converted from the first format to the second format for the volume 520. In one embodiment, the volume manifest comprises a list of features for the current volume format.

As an example, in this embodiment, the volume query component 710 can query the volume manifest for a status of desired features, and the conversion compatibility determiner 712 can use the status returned from the query to determine whether the desired feature is compatible with the second version. In this example, the conversion compatibility determiner 712 can review the returned features and determine whether the second format supports them and/or implements them is a different manner.

If it is determined that the desired features are not supported and/or may be implemented differently in the second format, the volume transition pre-conversion component 702 may not allow the volume conversion to continue. Further, in one embodiment, notification can be sent to an administrator (e.g., using a client 518 attached to the storage system 502 as in FIG. 5) identifying reasons why volume conversion cannot proceed.

In the exemplary system 700, a volume transition component 704 is disposed in the operating system 508, which is coupled to the volume 520, and is configured to convert the volume 520 from the first format to the second format. In one embodiment, the volume transition component 704 may be initialized (e.g., activated to begin volume transition) after receiving a determination from the volume transition pre-conversion component 702 that volume transition can proceed.

The volume transition component 704 comprises a transition starter component 714 configured to prepare the volume 520 for conversion to the second format. The volume transition component 704 further comprises a status notifier 716 configured to return a status of the volume conversion to the operating system. For example, the transition starter component 714 can prepare the volume for conversion and the volume transition component 704 can begin the conversion.

In this example, if errors or other issues arise during the volume conversion process the status notifier 716 can notify the system administrator, who may be able to address the issues during the conversion, or may be able to compile a list of issues to address prior to a subsequent attempt at converting the volume 520. Further, the status notifier 716 can notify the administrator if the conversion is completed successfully.

In the exemplary system 700, a post transition component 706 is disposed in the operating system 508, which is coupled to the volume 520, and configured to perform post-conversion operations for the volume conversion. If the volume conversion is completed in a desired manner (e.g., successful conversion from the first format to the second format, where the system administrator detects no errors) the post transition component 706 can be initialized to perform the post-conversion operations.

The post transition component 706 comprises a conversion notifier that is configured to notify clients that the volume has been converted from a first format to a second format. In one embodiment, clients can be notified in order to prevent them and/or their users from polling the volume to find out if the volume is available for access. Multiple polling of the volume may lead to a slower conversion process, which may prevent the conversion from completing successfully, for example.

In another embodiment, the post transition component 706 can transition the volume back to the first format if the conversion of the volume is not successful. In this embodiment, for example, if the conversion process takes longer than a desired time (e.g., one preset to accommodate data access for the volume) the conversion process may be aborted and the post transition component 706 can undo any conversion related operations that may have already occurred. As another example, errors may occur that inhibit the conversion process from completing in a desired manner. In this example, the post transition component 706 may receive notice that the conversion of the volume is to be "unwound" (e.g., returned to the first format). That is, changes that may have occurred are reversed so that the volume is returned to the first format. In another embodiment, returning the volume to the first format if the conversion is not successful may be performed by the volume transition component 704.

Figure 8:
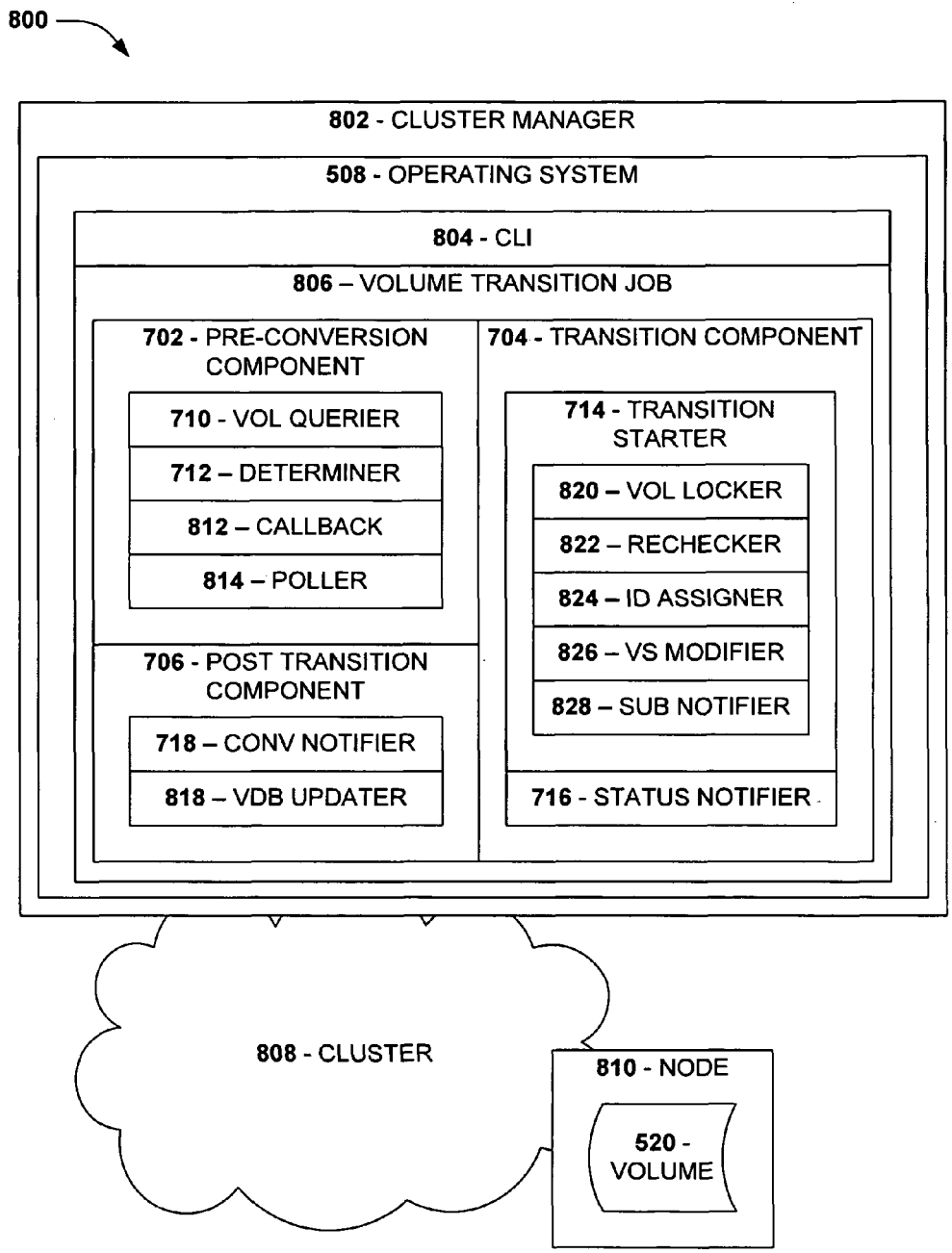
FIG. 8 is a component block diagram illustrating an exemplary embodiment of another system for performing in-place conversion of a data-storage volume from a first format to a second format

FIG. 8 is a component block diagram illustrating an exemplary embodiment 800 of another system for performing in-place conversion of a data-storage volume from a first format to a second format. In this embodiment, the exemplary system 800 can implement the exemplary system 700, from FIG. 7, and be utilized in a cluster storage system, such as described in the exemplary environment 600 of FIG. 6.

In the exemplary system 800, the operating system 508 is disposed on a cluster manager 802, which may be a computing device, for example, attached to a cluster 808, and used to manage cluster operations. Further, the volume 520 is coupled to a node 810 in the cluster, and typically can be accessed by other nodes in the cluster 808, and by clients associated with the cluster 808, for example, as described in FIGS. 5 and 6.

In this embodiment, the storage operating system 508 utilizes two components to perform volume conversion, a command line interface 804 (CLI) and a volume transition job component 806. The CLI 508 can be used to input commands and arguments associated with a volume conversion operation, for example, along with receiving feedback reports on a status of the conversion, and any error messages. Further, the CLI 508 can be configured to check validity of respective input arguments for a volume conversion, and invoke a volume conversion for the volume 520 in the clustered storage system 808.

In the exemplary system 800, the volume transition job component 806 comprises the volume transition pre-conversion component 702, the volume transition component 704, and the post transition component 706. In one embodiment, these components may be application programming interfaces configured to be processed by system processors (e.g., as in 506, FIG. 5), execute in the operating system environment 508, and act upon the volume 520 to perform a volume conversion.

In the exemplary system 800, the volume transition pre-conversion component 702 comprises a callback function 812 that is configured to return a result from a query to the volume manifest for the volume 520 as to whether a desired feature is enabled, for example, to the conversion compatibility determiner 712. In one embodiment, the callback function 812 can be registered with the volume manifest for the volume 520, and after successfully determining a state (e.g., enabled or disabled in the first format) of a desired feature (e.g., after being queried by the volume query component 710, as described above), the volume manifest can call to the callback function 812. In one embodiment, the callback function 812 can send a result to the conversion compatibility determiner 712 to determine how the volume transition pre-conversion component 702 may proceed with the conversion. In another embodiment, the callback function 812 may also return the result to the CLI 804, for example, to be used by an administrator.

The volume transition pre-conversion component 702 further comprises a volume polling component 814 that is configured to poll the volume 520 during conversion compatibility determination for a result and return a result of pending if a determination is not complete. In one embodiment, the volume polling component 814 can poll the volume 520 while a determination is being made for feature compatibility, and return a result of "pending" to the cluster manager 802, through the operating system 508, until a result of enabled or disabled is return for the respective features. In this way, if an abort command is issued during the feature compatibility determination, the cluster manager 802 may know a status of the pre-conversion operations.

In the exemplary system 800, the transition starter component 714 comprises a volume locking component 820 configured to close administrative access to the volume, and fence or otherwise block the volume from data access by any of a number of suitable techniques. Prior to beginning a volume conversion it is desirable to prevent access to the volume so that changes to data and/or metadata may not occur during the conversion. Once activated, the volume locking component 820 can prevent administrators from accessing the volume and mitigate clients accessing data on the volume by creating a fence, such as a data block to respective access points, around the volume 520.

The transition starter component 714 further comprises a feature set recheck component 822 configured to requery the volume manifest of the desired feature set. In this embodiment, after the volume has been locked from data access, it may be desirable to recheck the desired features to determine whether they are compatible with the second format for the volume, for example, to ensure that no changes have occurred prior to data access locking.

The transition starter component 714 further comprises a data set identifier assigner 824 configured to assign master data set identifiers (MSID) and data set identifiers (DSID) to the volume in a volume database; a virtual server (v-server) modifier 826 configured to modify v-server ownership (e.g., from a first to a second format) of volume in the volume database to reflect conversion; and a sub-system notifier 828 configured to make sub-systems aware of volume conversion.

In preparation for volume conversion, in one embodiment, data set identifiers are assigned for the second format of the volume 520. A volume database, such as a volume location database (VLDB), can comprise volume attribute entries for the cluster manager 802. In this embodiment, the VLDB entries can be temporary while the volume is preparing for conversion, and the volume attributes, such as MSID and DSID can be populated into appropriate tables on a temporary basis. In another embodiment, other volume attributes, such as export policy and junction path for the volume can be entered into the tables. Populated tables in the volume database can then be passed to the volume's storage system, for example.

Further, in preparation for volume conversion, in one embodiment, virtual server ownership is modified to reflect the volume conversion by the v-server modifier 826. Additionally, sub-systems, such as disk arrays and file systems, for the volume 520 can be notified of the pending conversion from the first to the second format for the volume 520 by the sub-system notifier 828.

In the exemplary system 800, the post transition component 706 comprises a volume database table updater 818 that is configured to change the attributes of the volume 520 populated into appropriate tables in the volume database from temporary to permanent (e.g., by changing a tag on the data from temporary to permanent) if the volume conversion is successful. As described above, for example, second format volume attributes, such as MSIDs and DSIDs, export policies and junction paths can be populated into a VLDB for the cluster manager 802. During volume transition, these entries are temporary, and after successful volume conversion the entries can be made permanent for the volume now in the second format.

On the other hand, if the volume conversion is not successful, the volume database table updater 818 is configured to remove the temporary entries for the volume in the volume database. For example, if the conversion is "failed," the volume database table updater 818 can remove the temporary entries from the VLDB and return previous entries that were associated with the first format for the volume.

In another embodiment, the conversion notifier 718, comprised in the post transition component 706, can be configured to provide application support notifications to volume enabled applications networked with the volume. For example, those applications running in a storage system that comprises the volume undergoing conversion may be waiting to contact the volume, for example, requesting data. The conversion notifier 718 can send notifications (e.g., using the cluster manager) to applications running on nodes and clients attached to the storage system, for example.

In an alternate embodiment, the techniques and systems described herein may utilize a transition manager for the volume conversion. In this embodiment, the transition manager may receive a request from a command line interface (CLI), such as described above, to create a volume transition job for converting the volume from a first format to a second format. For example, a system administrator may wish to perform a volume conversion and can use to the CLI to request a volume transition job.

In this embodiment, the transition manager can create the transition job for the volume, and add it to a job queue for the storage system. For example, a cluster manger may act as a transition manager and create and manage a job queue for a clustered storage system, which may include a volume transition job. The transition manager can initiate a transition job for the volume by invoking a run method for the transition job, for example, which can cause the transition job to initialize and execute.

Upon initializing the transition job for the volume, a pre-transition application programming interface (API) can be executed that determines whether the volume can be converted from the first format to the second format, as described above. In this embodiment, the pre-transition API can compare first format features of the volume to second format features of the volume to determine if the volume can be converted.

Further, in this embodiment, if it the pre-transition API determines that the volume can be converted, a transition API can be executed that converts the volume from the first format to the second format. Upon successful conversion of the volume, a post-transition API can perform post-conversion operations for the volume. However, if the conversion of the volume is not successful, the post-transition API can transition the volume back to the first format.

Figure 9:
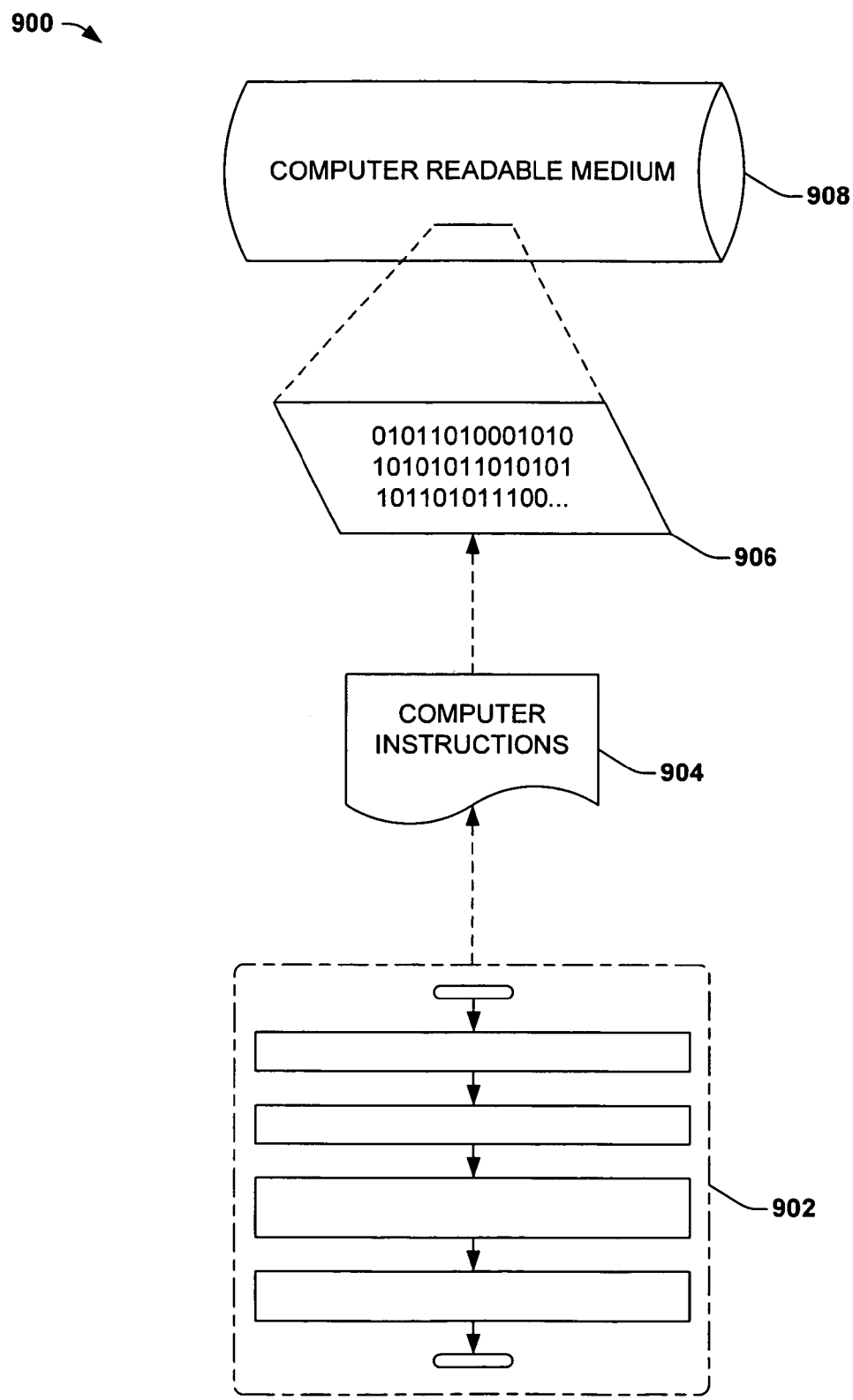
FIG. 9 is an illustration of an exemplary computer-useable medium comprising processor-executable instructions configured to embody one or more of the provisions set forth herein.

An exemplary computer-useable medium that may be devised in these ways is illustrated in FIG. 9, wherein the implementation 900 comprises a computer-useable medium 908 (e.g., a flash-drive, downloadable programming, CD-R, DVD-R, or a platter of a hard disk drive), on which is encoded computer-readable data 906. This computer-readable data 906 in turn comprises a set of computer instructions 904 configured to operate according to one or more of the principles set forth above. In one such embodiment, the processor-executable instructions 904 may be configured to perform the steps described in exemplary method 1, of FIG. 1.

In another such embodiment, the processor-executable instructions 904 may be configured to implement a system, such as the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Computer useable media is intended to comprise any mechanism that can store data, which can be thereafter, be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or electronically addressed non-volatile memory, CD-ROMs, CD-Rs, CD-RWs, DVDs, cassettes, magnetic tape, magnetic disk storage, optical or non-optical data storage devices and/or any other medium which can be used to store data. Computer useable media may also comprise communication media, which typically embodies computer readable instructions or other data in a modulated data signal such as a carrier wave or other transport mechanism (e.g., that has one or more of its characteristics set or changed in such a manner as to encode information in the signal). The computer useable medium can also be distributed (e.g., using a switching fabric, such as used in computer farms) over a network-coupled computer system so that computer readable code is stored and executed in a distributed fashion.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-distributed file systems. Furthermore, while this description has been written in terms of separate remote and support systems, the teachings are equally suitable to systems where the functionality of the remote and support systems are implemented in a single system. Alternately, the functions of remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for performing in-place conversion of a data-storage volume from a first format to a second format, comprising:
   determining if a conversion from the first format to the second format can be performed on the data-storage volume, comprising:
      identifying an inventory of desired features of the data-storage volume from a volume manifest; and
      determining compatibility of the desired features with the second format, comprising:
         querying the volume manifest for a status of the desired features, comprising:
            querying the volume manifest to identify features present in the first format; and
            querying a feature mapping table to identify features that are supported in the second format;
         determining whether respective desired features are supported in the second format; and
         determining whether the respective desired features are implemented differently in the second format;
   converting the data-storage volume from the first format to the second format if it is determined that a conversion from the first format to the second format can be performed on the data-storage volume, and blocking data requests for the data-storage volume prior to the converting; and
   performing post-conversion operations if the converting is completed in a desired manner comprising:
      unblocking the data-storage volume for data requests; and
      notifying client users that the data-storage volume is accessible.

2. The method of claim 1, comprising:
   determining that a conversion from the first format to the second format can be performed on the data-storage volume if respective desired features are supported in the second format and respective desired features are not implemented differently in the second format.

3. The method of claim 1, the determining if a conversion from the first format to the second format can be performed on the data-storage volume comprising running a simulation on desired features to check for incompatibilities with the second format.

4. The method of claim 1, the converting the data-storage volume from the first format to the second format, comprising generating a sequence of features to be converted from the first format to the second format.

5. The method of claim 1, blocking data requests for the data-storage volume comprising:
   creating a fence around the data-storage volume to prevent data traffic for the data-storage volume;
   allowing time for protocols to shutdown prior to the converting; and
   allowing time for the data-storage volume to drain prior to the converting.

6. The method of claim 5, comprising taking the data-storage volume offline.

7. The method of claim 5, comprising performing a second query to the volume manifest for desired feature compatibility with the second format after the data-storage volume has been fenced.

8. The method of claim 1, comprising providing notification to clients associated with the data-storage volume that a first format path for the data-storage volume is invalid.

9. The method of claim 1, comprising populating second format specific attributes to the data-storage volume.

10. The method of claim 1, the converting the data-storage volume from the first format to the second format, comprising returning the data-storage volume back to the first format if the converting exceeds a desired time.

11. The method of claim 10, the converting exceeding a desired time comprising blocking a request for data from the data-storage volume for a time greater than the desired time.

12. The method of claim 1, the performing post-conversion operations, comprising one or more of:
   associating an access path for the data-storage volume to the second format; and
   associating a virtual interface for the data-storage volume to the second format.

13. The method of claim 12, comprising:
testing a data-storage volume mounting point for system clients accessing the data-storage volume; and
testing a data-storage volume access path and a data-storage volume virtual interface for system clients accessing the data-storage volume.

14. The method of claim 1, the performing post-conversion operations comprising one or more of:
updating a client target mount point to accommodate the second format; and
remounting the data-storage volume using a path for the second format.

15. The method of claim 14, comprising remounting a system protocol export to reset file handles for the data-storage volume, the system protocol export associated with a system protocol comprising one of:
a network file system (NFS) protocol; and
a common internet file system (CIFS) protocol.

16. The method of claim 1, the performing post-conversion operations comprising one or more of:
transitioning data-storage volume specific data to the second format; and
populating data-storage volume data base tables for a storage system with data-storage volume attributes for the second format.

17. The method of claim 1, the first format comprising one of a plurality of volume formats that can be converted to the second format.

18. A system for performing in-place conversion of a data-storage volume from a first format to a second format, comprising:
a volume transition pre-conversion component disposed in an application management system coupled to a data-storage volume and configured to determine if the data-storage volume can be converted from a first format to a second format, comprising:
a data-storage volume query component configured to query a volume manifest for the data-storage volume for a desired feature set;
a conversion compatibility determiner configured to determine whether the desired feature set can be converted from the first format to the second format for the data-storage volume;
a callback function configured to return a query result from a query to the volume manifest for the data-storage volume as to whether a desired feature is enabled; and
a volume polling component configured to poll the data-storage volume and return a polling result of pending if a determination by the conversion compatibility determiner is not complete;
a volume transition component disposed in an application management system coupled to the data-storage volume and configured to convert the data-storage volume from the first format to the second format, comprising:
a transition starter component configured to prepare the data-storage volume for conversion; and
a status notifier configured to return a status of the conversion of the data-storage volume from the first format to the second format; and
a post transition component disposed in an application management system coupled to the data-storage volume and configured to perform post-conversion operations comprising a conversion notifier configured to notify clients that the data-storage volume has been converted from the first format to the second format, at least some of at least one of the volume transition pre-conversion component, the volume transition component, and the position transition component implemented at least in part by a processor.

19. The system of claim 18, the conversion compatibility determiner configured to compare the desired feature set with features in the second format.

20. The system of claim 18, the transition starter component comprising:
a volume locking component configured to:
close administrative access to the data-storage volume; and
fence the data-storage volume from data access.

21. The system of claim 18, comprising a feature set recheck component configured to requery the volume manifest.

22. The system of claim 18, comprising:
a data set identifier assigner configured to assign master data set identifiers (MSID) and data set identifiers (DSID) to the data-storage volume in a volume database;
a virtual server (v-server) modifier configured to modify v-server ownership of the data-storage volume in the volume database to reflect the conversion of the data-storage volume from the first format to the second format; and
a sub-system notifier configured to make sub-systems aware of the conversion of the data-storage volume from the first format to the second format.

23. The system of claim 18, the volume transition component comprising a volume database entry populator configured to:
populate attributes of the data-storage volume into appropriate tables in a volume database on a temporary basis; and
pass the populated tables in the volume database to a storage system.

24. The system of claim 18, the status of the conversion of the data-storage volume from the first format to the second format comprising one of successful or failed.

25. The system of claim 18, the post transition component comprising a volume database table updater configured to:
change attributes of the data-storage volume populated into appropriate tables in a volume database from temporary to permanent if the conversion of the data-storage volume from the first format to the second format is successful; and
remove temporary entries for the data-storage volume in the volume database if the conversion of the data-storage volume from the first format to the second format is not successful.

26. The system of claim 18, the conversion notifier configured to provide application support (ASUP) notifications to volume enabled applications networked with the data-storage volume.

27. The system of claim 18, the data-storage volume disposed in a clustered storage system comprising a cluster manager configured to manage conversion of a volume from the first format to the second format.

28. The system of claim 27, the cluster manager comprising a command line interface (CLI) configured to:
check validity of respective input arguments for a volume conversion; and
invoke a volume conversion for the volume in the clustered storage system.

29. The system of claim 27, the cluster manager comprising a volume transition job component comprising:
the volume transition pre-conversion component;
the volume transition component; and the post transition component.

30. The system of claim 18, the application management system comprising a volume operating system.

31. A computer program product comprising:
computer code configured to determine if a conversion from a first format to a second format can be performed on a data-storage volume, comprising;
  computer code configured to identify an inventory of desired features of the data-storage volume from a volume manifest; and
  computer code configured to determine compatibility of the desired features with the second format, comprising:
    querying the volume manifest for a status of the desired features, comprising:
      querying the volume manifest to identify features present in the first format; and
      querying a feature mapping table to identify features that are supported in the second format;
    determining whether respective desired features are supported in the second format; and
    determining whether the respective desired features are implemented differently in the second format;
computer code configured to convert the data-storage volume from the first format to the second format if it is determined that a conversion from the first format to the second format can be performed on the data-storage volume;
computer code configured to perform post-conversion operations if the conversion is completed in a desired manner, comprising computer code configured to notify client users that the data-storage volume is accessible; and
a computer readable storage medium that stores the computer code.

32. A method for performing in-place conversion of a data-storage volume from a first format to a second format, comprising:
  a command line interface (CLI) checking validity of input arguments for a request to convert the data-storage volume from the first format to the second format;
  the CLI requesting that a transition manager create a transition job for the data-storage volume if the input arguments are valid;
  the transition manager creating a transition job for the data-storage volume and adding it to a job queue for a storage system;
  the transition manager initiating the transition job for the data-storage volume by invoking a run method of the transition job; and
  executing the transition job for the data-storage volume comprising:
    executing a pre-transition application programming interface (API) that determines whether the data-storage volume can be converted from the first format to the second format, comprising comparing first format features of the data-storage volume to second format features of the data-storage volume;
    executing a transition API that converts the data-storage volume from the first format to the second format if the pre-transition API determines that the data-storage volume can be converted from the first format to the second format; and
    executing a post-transition API that:
      performs post-conversion operations for the data-storage volume if the converting of the data-storage volume from the first format to the second format is successful; and
      transitions the data-storage volume back to the first format if the conversion of the data-storage volume from the first format to the second format is not successful.

* * * * *